United States Patent
Jamilosa

(10) Patent No.: US 12,497,750 B2
(45) Date of Patent: Dec. 16, 2025

(54) PIVOTING PINNED CONNECTION FOR A ROPE SHOVEL BUCKET

(71) Applicant: Caterpillar Global Mining LLC, Tucson, AZ (US)

(72) Inventor: James G. Jamilosa, Waipahu, HI (US)

(73) Assignee: Caterpillar Global Mining LLC, Tucson, AZ (US)

( * ) Notice: Subject to any disclaimer, the term of this patent is extended or adjusted under 35 U.S.C. 154(b) by 657 days.

(21) Appl. No.: 17/698,591

(22) Filed: Mar. 18, 2022

(65) Prior Publication Data

US 2023/0295895 A1    Sep. 21, 2023

(51) Int. Cl.
| | | |
|---|---|---|
| *E02F 3/36* | (2006.01) | |
| *E02F 9/00* | (2006.01) | |
| *F16C 11/04* | (2006.01) | |
| *E02F 3/30* | (2006.01) | |

(52) U.S. Cl.
CPC ............ *E02F 3/3677* (2013.01); *E02F 9/006* (2013.01); *F16C 11/04* (2013.01); *E02F 3/308* (2013.01)

(58) Field of Classification Search
CPC ......... E02F 3/308; E02F 3/3677; E02F 9/006; F16C 11/04
See application file for complete search history.

(56) References Cited

U.S. PATENT DOCUMENTS

| | | | |
|---|---|---|---|
| 5,320,443 A * | 6/1994 | Lien ...................... | E02F 9/006 403/334 |
| 6,273,632 B1 | 8/2001 | Takahashi et al. | |
| 6,694,571 B2 * | 2/2004 | Albright ............... | F16C 11/045 16/386 |
| 9,249,554 B2 | 2/2016 | Colwell et al. | |
| 9,587,375 B2 | 3/2017 | Carbaugh et al. | |
| 9,784,103 B2 | 10/2017 | Gross et al. | |
| 2016/0289920 A1 * | 10/2016 | Carbaugh ................ | E02F 3/60 |
| 2021/0033169 A1 | 2/2021 | Gross et al. | |
| 2024/0191477 A1 * | 6/2024 | Vera Torres .......... | E02F 3/4075 |

FOREIGN PATENT DOCUMENTS

| | | | |
|---|---|---|---|
| JP | S63176153 U | * | 11/1988 |
| JP | H06300033 A | * | 10/1994 |

\* cited by examiner

*Primary Examiner* — Saul Rodriguez
*Assistant Examiner* — Brendan P Tighe

(57) ABSTRACT

A pivoting connection between a bucket and a padlock of a rope shovel, a pin assembly, and a rope shovel are disclosed. A pivoting connection includes a pin having a pin axis and extending through a bucket lug of the bucket and a pair of padlock lugs of the padlock; a flag having a pin end and a mounting end; a locking coupling coaxial with the pin axis and located in the pin end of the flag, wherein the locking coupling selectively couples the flag to the pin; and a slotted flag mount attached to the bucket including a vertical slot and a horizontal slot parallel to the pin axis; wherein the mounting end of the flag is received by the slotted flag mount such that the pin is constrained from rotating with respect to the bucket and from translating along the pin axis.

20 Claims, 4 Drawing Sheets

PIVOTING PINNED CONNECTION FOR A ROPE SHOVEL BUCKET

TECHNICAL FIELD

The present disclosure relates generally to a pivoting pinned connection for a rope shovel bucket, and more particularly, to a pinned connection that uses a flag to constrain the pin from rotating and translating.

BACKGROUND

Power shovels are in a category of excavation equipment used to remove large amounts of material during a mining operation. One type of power shovel is known as a rope shovel. A rope shovel includes a bucket that pivots via the movement of a padlock attached to a cable that is reeled in or spooled out by electric, hydraulic, and/or pneumatic motors to selectively raise and lower the bucket. The connection between the bucket and the padlock can experience large forces during use. Connections can generally include lugs connected by a pin to allow the angle between the bucket and the padlock to change as the bucket is pivoted by the rope shovel. When the pin rotates with respect to the bucket, the forces applied to the pin and bucket combined with the rotation can create friction that can damage the pin over time. Further, the pin can experience axial forces, and to prevent the pin from sliding axially, thrust bearing surfaces may be needed. These thrust bearing surfaces can also experience wear over time, and may need maintenance and/or replacement.

An exemplary bucket system of a rope shovel including a bucket, padlock and padlock pin is disclosed in U.S. Pat. No. 9,587,375 (the '375 patent) to Carbaugh et al. The bucket system described in the '375 patent includes a bucket lug, padlock lugs, and a padlock pin received by the lugs. The bucket system further includes an arm portion fixedly connected to the padlock pin and restrained by a pair of stops attached to the bucket to restrain rotation of the padlock pin relative to the bucket.

While the arrangement described in the '375 patent may be useful to prevent rotation of the pin relative to the bucket, it may require a separate component, such as the collar assembly described in the '375 patent, to prevent axial movement of the padlock pin. At least due to the requirement of additional components, as well as the time and labor required to maintain and/or replace them, a pin with an integral arm portion requiring a separate component to prevent axial movement can introduce additional cost and complexity to the operation and maintenance of a rope shovel.

The pivoting pinned connection of the present disclosure may solve one or more of the problems set forth above and/or other problems in the art. The scope of the current disclosure, however, is defined by the attached claims, and not by the ability to solve any specific problem.

SUMMARY

In one aspect, a pivoting connection between a bucket and a padlock of a rope shovel is disclosed. The pivoting connection includes: a pin having a pin axis and extending through a bucket lug of the bucket and a pair of padlock lugs of the padlock; a flag having a pin end and a mounting end; a locking coupling coaxial with the pin axis and located in the pin end of the flag, wherein the locking coupling selectively couples the flag to the pin; and a slotted flag mount attached to the bucket including a vertical slot and a horizontal slot parallel to the pin axis; wherein the mounting end of the flag is received by the slotted flag mount such that the pin is constrained from rotating with respect to the bucket and from translating along the pin axis.

In another aspect, a pin assembly for a connection between a bucket and a padlock of a rope shovel is disclosed. The pin assembly includes: a pin having a pin axis and extending through a bucket lug of the bucket and a pair of padlock lugs of the padlock; a flag having a pin end and a mounting end; and a locking coupling coaxial with the pin axis and located in the pin end of the flag, wherein the locking coupling selectively couples the flag to the pin; wherein the mounting end of the flag abuts a slotted flag mount attached to the bucket such that the pin is constrained from rotating with respect to the bucket and from translating along the pin axis.

In yet another aspect, a rope shovel is disclosed. The rope shovel including: a bucket having a bucket lug and a slotted flag mount including a vertical slot and a horizontal slot; a padlock having a pair of padlock lugs; a pin having a pin axis and extending through the bucket lug and the pair of padlock lugs; a flag having a mounting end and a pin end including a first substantially cylindrical protrusion extending from a first side of the flag and a second substantially cylindrical protrusion extending from a second side of the flag opposite the first side; and a locking coupling coaxial with the pin axis and located in the pin end of the flag, wherein the locking coupling selectively couples the flag to the pin; wherein the mounting end of the flag is received by the slotted flag mount such that the pin is constrained from rotating with respect to the bucket and from translating along the pin axis.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
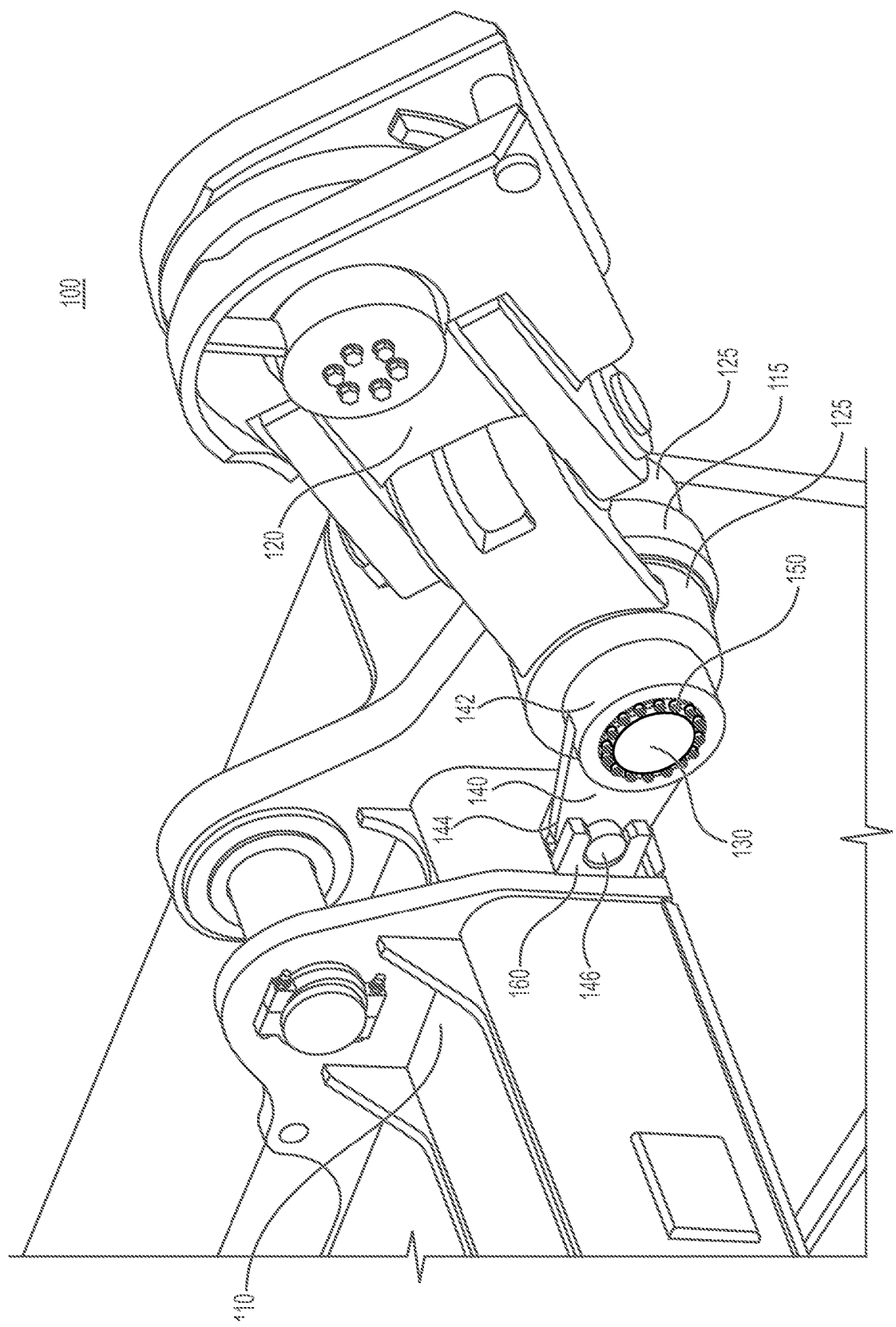
FIG. 1 is a perspective view of an assembled connection between a padlock and a bucket of a rope shovel, according to aspects of the disclosure.

An assembled connection 100 between a bucket 110 and a padlock 120 of a rope shovel is depicted in FIG. 1. Rope shovels can use a pivoting bucket 110 to, for example, dig into a material to load some of that material into bucket 110, and subsequently move and/or deposit the contents of bucket 110 in a different location, such as into a haul truck. Padlock 120 is coupled to and manipulated by a cable of the rope shovel to move and position the bucket 110 during one or more of the digging, swinging, dumping, or returning movements of the rope shovel. Bucket 110 may be pivoted about a pinned connection 100 between the bucket 110 and the padlock 120. Bucket 110 may include one or more bucket lugs 115, and padlock 120 may include two or more padlock lugs 125. Connection 100 may include pin 130 extending through bucket lug 115 of bucket 110 and two or more padlock lugs 125 of the padlock 120. For example, as depicted on FIG. 1, connection 100 may include a pair of padlock lugs 125 positioned on either side of bucket lug 115.

In some embodiments, pin 130 can be constrained from rotating with respect to bucket 110 by flag 140. Flag 140 can have a pin end 142 connected to pin 130 via coupling 150, and a mounting end 144 extending away from pin 130 and prevented from rotating with respect to bucket 110 by cooperation between one or more protrusions 146 of flag 140 and flag mount 160. The components that constrain the rotation of pin 130, including flag 140, coupling 150 and flag mount 160 can be seen in additional detail in FIG. 2.

Figure 2:
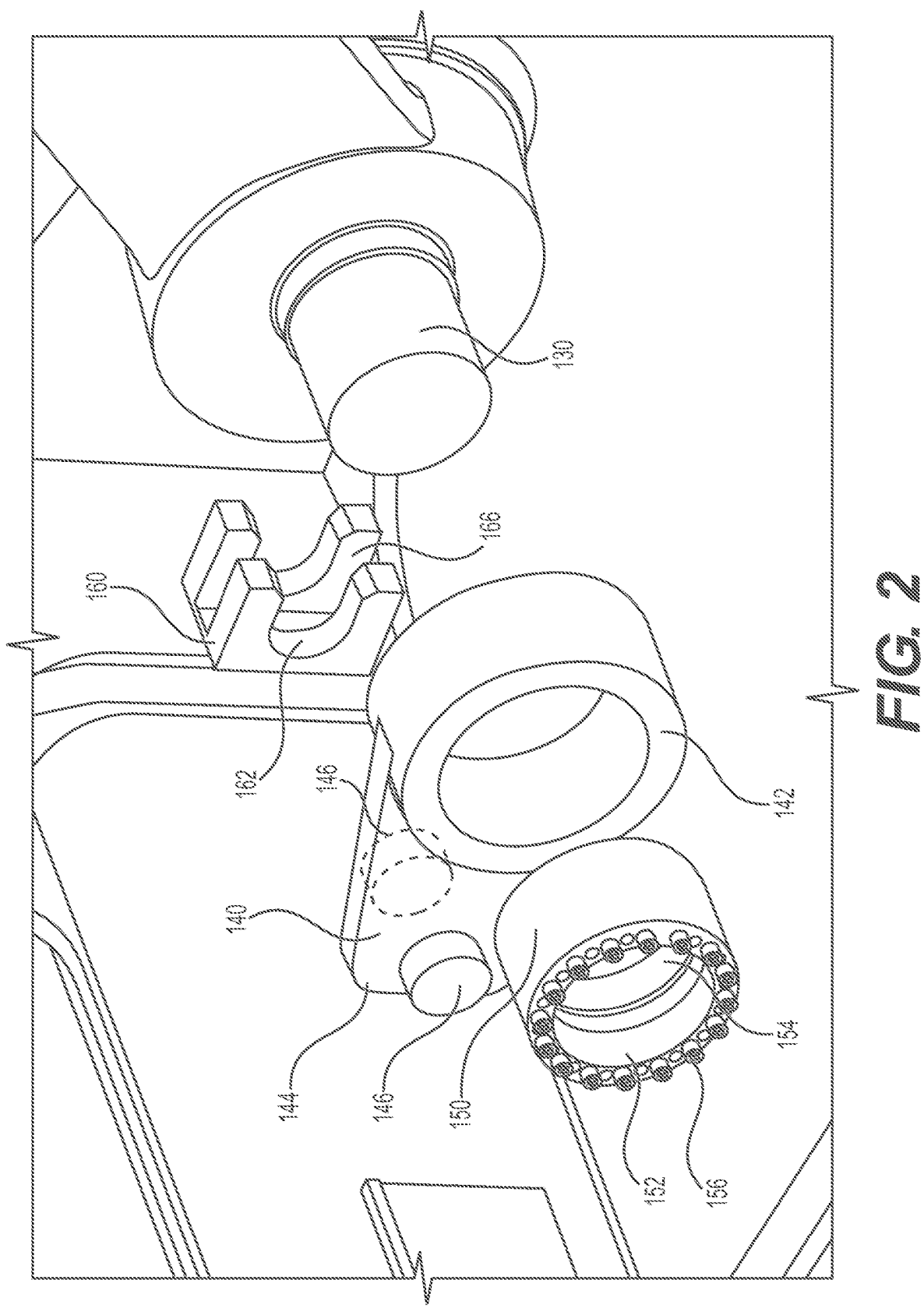
FIG. 2 is an exploded perspective view of a connection between a padlock and a bucket of a rope shovel, according to aspects of the disclosure.

An embodiment of components of connection 100 between bucket 110 and padlock 120 is depicted in exploded perspective view in FIG. 2. Pin 130 can be connected to flag 140 by coupling 150, for example, a locking coupling such as a keyless bushing. Keyless bushings are couplings that do not require either pin 130 or flag 140 to have a protrusion therefrom to resist the independent rotation of the other components, and this type of coupling can reduce or eliminate the need for rotational alignment between pin 130, flag 140, and coupling 150 during assembly. Coupling 150 can provide a frictional connection between an outer surface of pin 130 and an inner surface of pin end 142. As depicted, coupling 150 can use tapered or wedge-shaped surfaces associated with a first portion 152 and a second portion 154 of coupling 150 in combination with an axial force provided by a plurality of fasteners 156 to translate the axial force provided by fasteners 156 into a pair of radial forces. As fasteners 156 engage the first and second portions 152, 154 of coupling 150, the axial force applied pulls the portions together, and, due to the tapered surfaces, coupling 150 changes dimension in a radial direction. These radial forces include one contracting force on an inner surface of coupling 150 to squeeze an outer surface of pin 130, while the other force increases or expands an outer dimension of coupling 150 to press coupling 150 into the inner surface of the pin end 142 of flag 140. The resulting frictional connection can be spread over a wide contact surface to rotationally fix pin 130 and flag 140 without the creation of stress concentrations that could be created by other forms of connection, such as keying or bolting. In some embodiments, coupling 150 may be self-centering and/or self-aligning to ensure that coupling 150 and pin 130 are coaxial with one another when in an installed state.

In order to prevent flag 140 and pin 130 from rotating with respect to bucket 110, flag 140 can be received within horizontal slot 162 and vertical slot 166 of flag mount 160. In some embodiments, horizontal slot 162 can be formed by one or more pairs of arms, each pair including one or more curved surfaces sized to receive the one or more substantially cylindrical protrusions 146 of flag 140. The elements that form flag mount 160 can be integrally formed with bucket 110, or may be attached thereto by a suitably durable method, such as welding or bolting. For example, as depicted in FIG. 2, flag 140 includes two cylindrical protrusions 146 on opposite sides thereof, and flag mount 160 includes two pairs of arms with a curved surface between each arm of the pair sized to receive the two protrusions 146. The surfaces of horizontal slot 162 can abut or interfere with one or more protrusions 146 in order to constrain the rotation of flag 140 and pin 130. In addition to preventing the rotation of pin 130, flag 140 can cooperate with vertical slot 166 to constrain pin 130 from translating axially. The axes about which flag mount 160 and flag 140 constrain the motion of pin 130 with respect to bucket 110 are illustrated in FIG. 3.

Figure 3:
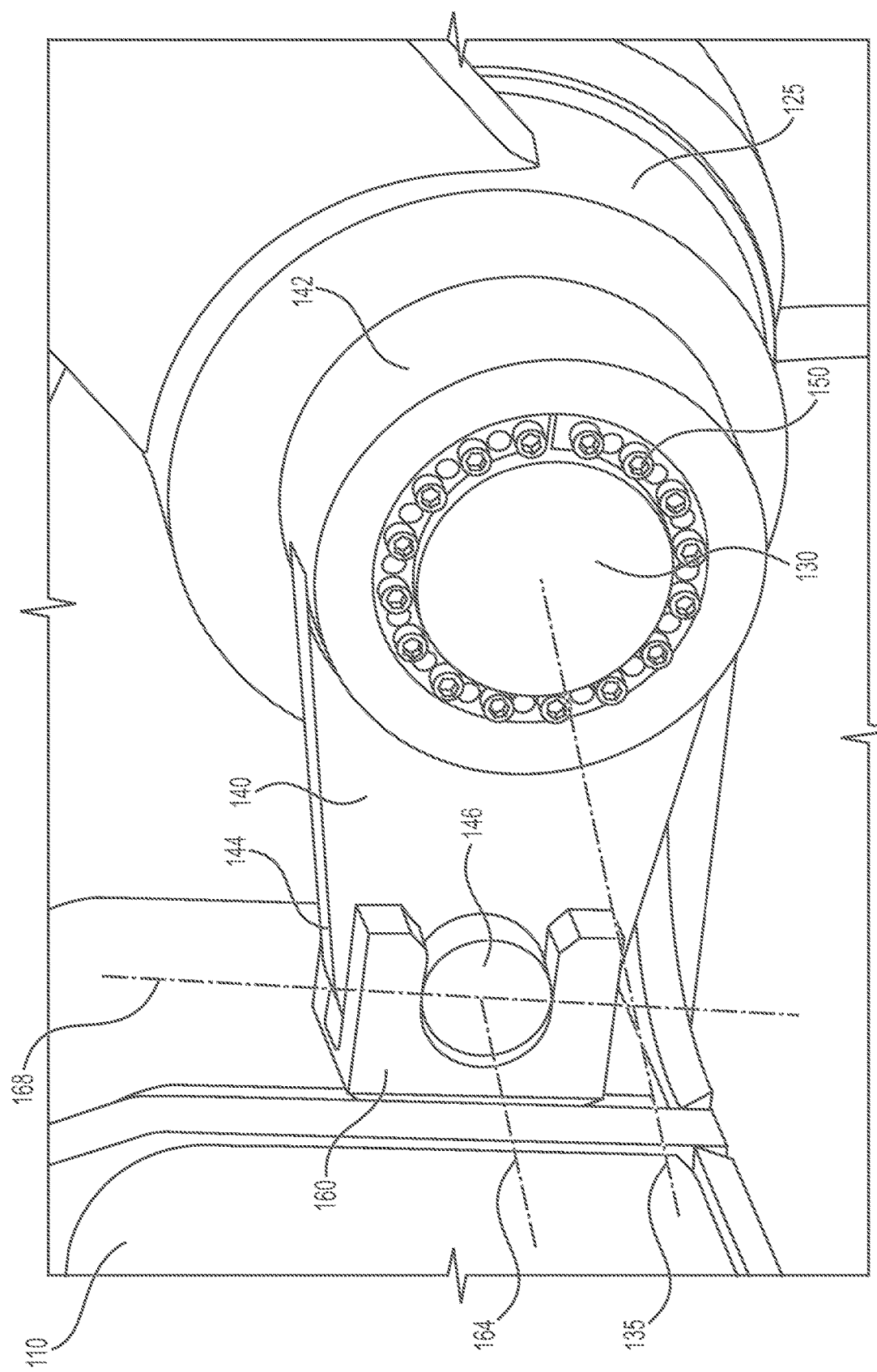
FIG. 3 is a perspective view of a flag and flag mount of the connection between the padlock and the bucket of a rope shovel, according to aspects of the disclosure.

Focusing in on flag 140 and flag mount 160, FIG. 3 shows the geometry of pin axis 135, horizontal mounting axis 164 parallel to pin axis 135, and vertical mounting axis 168 perpendicular to the horizontal mounting axis 164. As discussed with respect to FIG. 2, flag mount 160 constrains flag 140 from both rotating in the vertical mounting axis 168 direction and translating linearly about the horizontal mounting axis 164. By constraining the motion of flag 140, flag mount 160 indirectly serves to fix pin 130 from rotating with respect to bucket 110, as well as preventing pin 130 from translating in the pin axis 135 direction. Because pin 130 is prevented from rotating with respect to bucket 110 (including bucket lug 115), as connection 100 pivots, pin 130 will instead rotate with respect to padlock 120. At least because there are two or more padlock lugs 125, the surface area of contact between pin 130 and padlock 120 can be greater that the surface area of contact between pin 130 and bucket 110. Further, as a result of the fixation in the pin axis 135 direction, flag 140 is able to serve as a thrust bearing for connection 100. In some embodiments, because flag 140 serves to counter any thrust forces experienced by pin 130, connection 100 may be able to avoid the need for separate thrust bearing(s).

Figure 4:
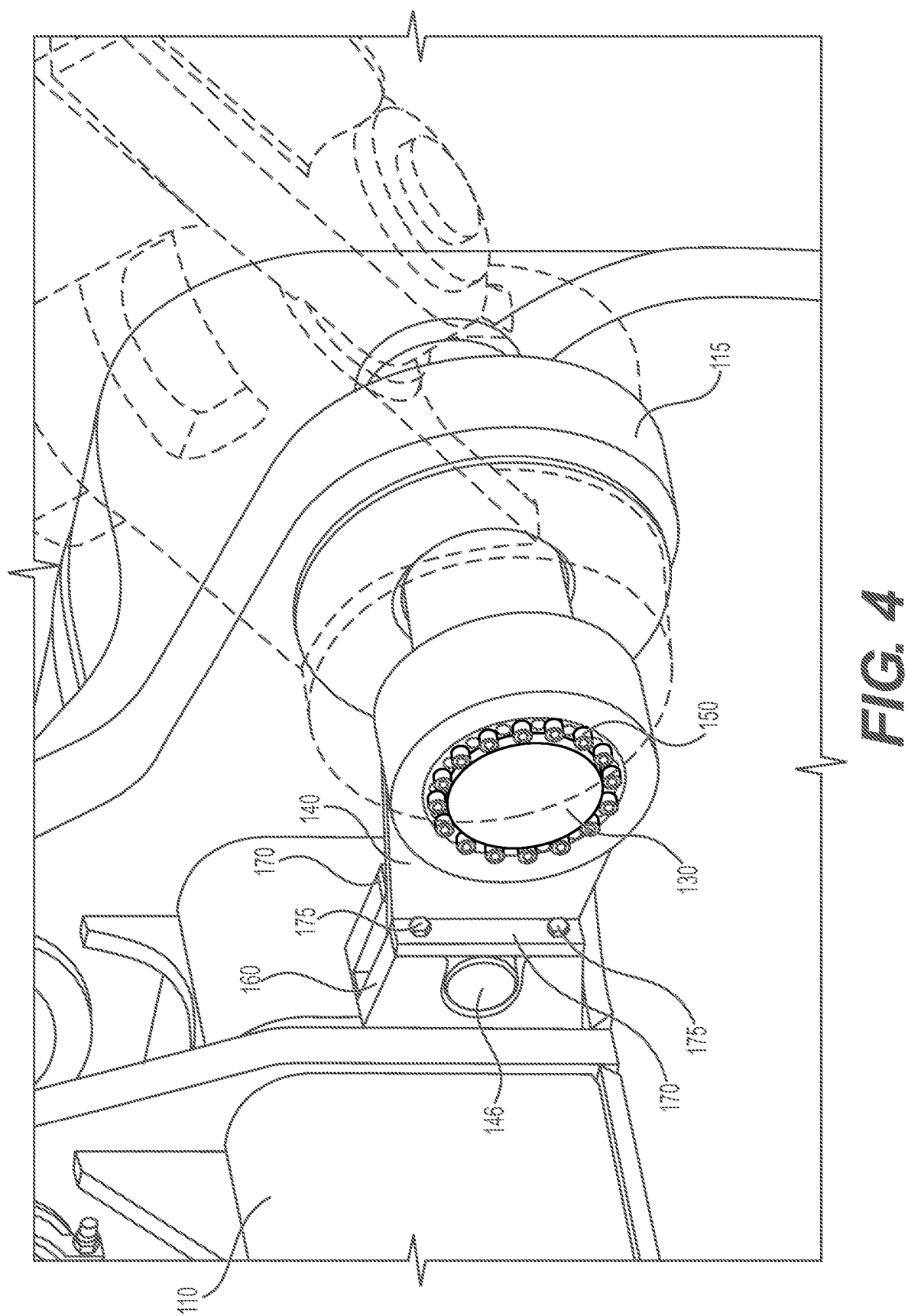
FIG. 4 is a perspective view of a flag and flag mount of an alternative embodiment of a connection between the padlock and the bucket of a rope shovel including flag retention plates, according to aspects of the disclosure.

In some embodiments, flag 140 can be retained by flag mount 160 as depicted in FIG. 4. The depicted embodiment includes one or more flag retention plates 170 secured to flag mount 160 on the side of at least one of the one or more protrusions 146 opposite bucket 110 by one or more retention plate fasteners 175 (e.g., bolts). This configuration can, for example, allow flag 140 to be installed prior to the assembly of connection 100 thereby reducing the number of separate components to be assembled on site to secure bucket 110 to padlock 120. Flag retention plates 170 can constrain the motion of flag 140 such that it can pivot with respect to bucket 110 prior to the insertion of pin 130, but such that mounting end 144 of flag 140 is not able to disengage from flag mount 160. The pivoting motion of flag 140 allowed by flag retention plates 170 and flag mount 160 can be sufficient to allow pin end 142 of flag 140 to be aligned with the through holes of bucket lug 115 and padlock lugs 125 such that pin 130 can pass through each of them in the pin axis 135 direction. Once pin 130 is passed through bucket lug 115, padlock lugs 125, and pin end 142, the fasteners 156 of coupling 150 can be tightened to fix pin 130 to flag 140 and, in turn, to bucket 110.

INDUSTRIAL APPLICABILITY

The disclosed aspects of the pivoting pinned connection 100 of the present disclosure may be used to provide a durable and serviceable connection between a padlock 120 and bucket 110 of a rope shovel. Improved durability may result from both/either of the prevention of pin rotation and the prevention of axial movement of the pin 130 with respect to the bucket 110. For example, a freely rotating pin can wear over the relatively smaller surface area of the bucket lug as opposed to the padlock lugs. Similarly, even a conventional flagged pin will tend to wear over this smaller surface if it is pinned to the outer padlock lugs, while remaining free to rotate with respect to the bucket lug. Due to the cost and machine downtime associated with replacing the pin, an extension of the service time of the pin through the use of a connection according to the present disclosure, the pin may not require service and/or replacement as frequently.

Relatedly, a freely rotating pin or a flagged pin similar to that disclosed in the '375 patent will still require a feature to locate and constrain the pin in the axial direction. Constraining the pin in an axial direction generally creates the need for a thrust bearing and/or thrust bearing surface. The necessity of these bearing surfaces results in the inclusion of an additional wear part that will need service and/or replacement over time. Using a connection according to the present disclosure may reduce the number, size, wear, and cost of these bearing surfaces, and in some embodiments can eliminate the need for them entirely. A reduction to the number of parts to be serviced and/or replaced can, in turn, enable the machine to be in service longer in between periods of maintenance.

Benefits of the durable pivoting pinned connection of the present disclosure may include reduced machine downtime that can result from less service of the connection being required. However, even the service that may still be required can be simplified and made easier to complete in the field, thus reducing further machine downtime. For example, a connection 100 in accordance with the present disclosure may be serviced with fewer loose parts that can be lost or damaged during maintenance. For example, the fasteners 156 in the coupling 150 between the flag 140 and the pin 130 need not be fully removed during or prior to pin installation. This is the result of the fasteners 156 not being relied on to align parts or resist radial forces, but rather relied on to apply an axial force within the coupling 150. Because the alignment of the parts of coupling 150 itself can be done in advance of being on site for final assembly on the bucket, the need for any fasteners to be aligned with holes or components in the field is reduced or eliminated, as a maintenance technician can simply tighten the fasteners 156 that are already in their bores to couple the pin 130 to the flag 140. In embodiments that include flag retention plates 170, even the flag 140 need not be loose from the bucket 110 during pin replacement. The flag retention plates 170 can retain the flag 140 such that a maintenance technician need only rotate the flag 140 to be in alignment with the lugs 115, 125 while the pin is being installed. Being able to more quickly and reliably service or replace components of the connection, for example, in the field, can reduce machine downtime, reduce the cost of service, and decrease the chances of misaligned and/or improperly installed components.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A pivoting connection between a bucket and a padlock of a rope shovel, comprising:
    a pin having a pin axis and extending through a bucket lug of the bucket and a pair of padlock lugs of the padlock;
    a flag having a pin end and a mounting end;
    a locking coupling coaxial with the pin axis and located in the pin end of the flag, wherein the locking coupling selectively couples the flag to the pin; and
    a slotted flag mount attached to the bucket including a vertical slot and a horizontal slot parallel to the pin axis,
    wherein the slotted flag mount comprises a first arm and a second arm, the first arm and the second arm spaced apart along a direction substantially parallel to the pin axis to provide the vertical slot, the first arm and the second arm including the horizontal slot;
    wherein the mounting end of the flag is received by the slotted flag mount such that the first arm is on one side of the flag and the second arm is on an opposite side of the flag, and the pin is constrained from rotating with respect to the bucket and from translating along the pin axis.

2. The pivoting connection of claim 1, wherein the pin end of the flag includes one or more protrusions.

3. The pivoting connection of claim 2, wherein the one or more protrusions are substantially cylindrical.

4. The pivoting connection of claim 3, wherein the slotted flag mount includes a curved surface sized to receive the one or more protrusions.

5. The pivoting connection of claim 2, wherein the one or more protrusions comprise a first protrusion extending from a first side of the flag and a second protrusion extending from a second side of the flag opposite the first side.

6. The pivoting connection of claim 1, wherein the locking coupling comprises a radially expandable coupling located radially between an inner surface of the pin end of the flag and an outer surface of the pin.

7. The pivoting connection of claim 6, the locking coupling further comprising:
    a first portion and a second portion; and
    one or more fasteners that engage the first and second portions of the locking coupling.

8. The pivoting connection of claim 7, wherein tightening the one or more fasteners increases an outer dimension of the locking coupling and decreases an inner dimension of the locking coupling.

9. The pivoting connection of claim 1, further comprising one or more flag retention plates secured to the slotted flag mount such that the one or more flag retention plates prevent the mounting end of the flag from disengaging from the slotted flag mount.

10. A pin assembly for a connection between a bucket and a padlock of a rope shovel, comprising:
    a pin having a pin axis and extending through a bucket lug of the bucket and a pair of padlock lugs of the padlock;
    a flag having a pin end and a mounting end; and
    a locking coupling coaxial with the pin axis and located in the pin end of the flag, wherein the locking coupling selectively couples the flag to the pin;
    wherein the mounting end of the flag abuts both a first arm and a second arm of a slotted flag mount attached to the bucket,
    wherein the first arm and the second arm are spaced apart along a mounting axis, and the mounting axis is substantially parallel to the pin axis.

11. The pin assembly of claim 10, wherein the pin end of the flag includes one or more protrusions.

12. The pin assembly of claim 11, wherein the one or more protrusions are substantially cylindrical.

13. The pin assembly of claim 12, wherein the one or more protrusions sized to receive one or more curved surfaces of the slotted flag mount.

14. The pin assembly of claim 11, wherein the one or more protrusions comprise a first protrusion extending from a first side of the flag and a second protrusion extending from a second side of the flag opposite the first side.

15. The pin assembly of claim 10, wherein the locking coupling comprises a radially expandable coupling located radially between an inner surface of the pin end of the flag and an outer surface of the pin.

16. The pin assembly of claim 15, the locking coupling further comprising:
  a first portion and a second portion; and
  one or more fasteners that engage the first and second portions of the locking coupling.

17. The pin assembly of claim 16, wherein tightening the one or more fasteners increases an outer dimension of the locking coupling and decreases an inner dimension of the locking coupling.

18. The pin assembly of claim 10, wherein the mounting end of the flag is prevented from disengaging from the slotted flag mount by one or more flag retention plates secured to the slotted flag mount.

19. A rope shovel, comprising:
  a bucket having a bucket lug and a slotted flag mount including a vertical slot and a horizontal slot, the vertical slot provided by a pair of arms;
  a padlock having a pair of padlock lugs;
  a pin having a pin axis and extending through the bucket lug and the pair of padlock lugs;
  a flag having a mounting end and a pin end including a first substantially cylindrical protrusion extending from a first side of the flag and a second substantially cylindrical protrusion extending from a second side of the flag opposite the first side; and
  a locking coupling coaxial with the pin axis and located in the pin end of the flag, wherein the locking coupling selectively couples the flag to the pin;
  wherein the mounting end of the flag is received by the slotted flag mount such that the pin is constrained from rotating with respect to the bucket and from translating along the pin axis, and
  wherein the arms constrain movement of the flag in a direction along the pin axis.

20. The rope shovel of claim 19, wherein the mounting end of the flag is prevented from disengaging from the slotted flag mount by one or more flag retention plates secured to the slotted flag mount.

* * * * *